(12) United States Patent
Vardy et al.

(10) Patent No.: US 12,458,169 B2
(45) Date of Patent: Nov. 4, 2025

(54) COOKING APPARATUS

(71) Applicant: David Alan Vardy, Berkeley, CA (US)

(72) Inventors: David Alan Vardy, Berkeley, CA (US); Charles Leslie Floyd, Oakland, CA (US)

(73) Assignee: David Alan Vardy, Berkeley, CA (US)

( * ) Notice: Subject to any disclaimer, the term of this patent is extended or adjusted under 35 U.S.C. 154(b) by 0 days.

(21) Appl. No.: 18/848,886

(22) PCT Filed: Mar. 20, 2023

(86) PCT No.: PCT/US2023/015688
§ 371 (c)(1),
(2) Date: Sep. 19, 2024

(87) PCT Pub. No.: WO2023/183259
PCT Pub. Date: Sep. 28, 2023

(65) Prior Publication Data
US 2025/0107657 A1    Apr. 3, 2025

Related U.S. Application Data

(60) Provisional application No. 63/269,768, filed on Mar. 22, 2022.

(51) Int. Cl.
*A47J 37/07* (2006.01)
*A47J 36/02* (2006.01)
*A47J 36/38* (2006.01)
*F24C 15/14* (2006.01)

(52) U.S. Cl.
CPC .......... *A47J 37/0709* (2013.01); *A47J 36/02* (2013.01); *A47J 36/38* (2013.01); *F24C 15/14* (2013.01)

(58) Field of Classification Search
CPC ........ A47J 37/0709; A47J 36/02; A47J 36/38; F24C 15/14
See application file for complete search history.

(56) References Cited

U.S. PATENT DOCUMENTS

| | | | | |
|---|---|---|---|---|
| 4,495,764 | A | * | 1/1985 | Gnagy ................. F02K 9/34 428/116 |
| 5,197,379 | A | * | 3/1993 | Leonard, Jr. ........ A47J 37/0704 126/25 R |

(Continued)

OTHER PUBLICATIONS

Written Opinion issued in PCT Application No. PCT/US2023/015688, mailed Jul. 13, 2023, in 10 pages.

*Primary Examiner* — Edward F Landrum
*Assistant Examiner* — Kuangyue Chen
(74) *Attorney, Agent, or Firm* — Knobbe, Martens, Olson & Bear, LLP

(57) ABSTRACT

A cooking apparatus is disclosed. The cooking apparatus can include a support structure for supporting food, an outer housing having an angled inner sidewall, an inner trough disposed within the outer housing below the support structure, a heating element to generate a flame in operation of the cooking apparatus, and an annular gap between the angled inner sidewall of the outer housing and the inner trough. The annular gap extending from the heating element towards the support structure. The outer housing can include a plurality of layers including a ceramic inner layer. The ceramic inner layer can include METEORITE™ CERAMIC.

17 Claims, 10 Drawing Sheets

(56) References Cited

U.S. PATENT DOCUMENTS

| | | | |
|---|---|---|---|
| 5,649,477 A * | 7/1997 | Lingwood | A47J 37/0713 99/446 |
| 6,213,006 B1 | 4/2001 | Reardon et al. | |
| 2010/0132689 A1 | 6/2010 | Contarino | |
| 2015/0182074 A1 | 7/2015 | Bucher et al. | |
| 2022/0196244 A1* | 6/2022 | Hamilton | F23L 3/00 |

* cited by examiner

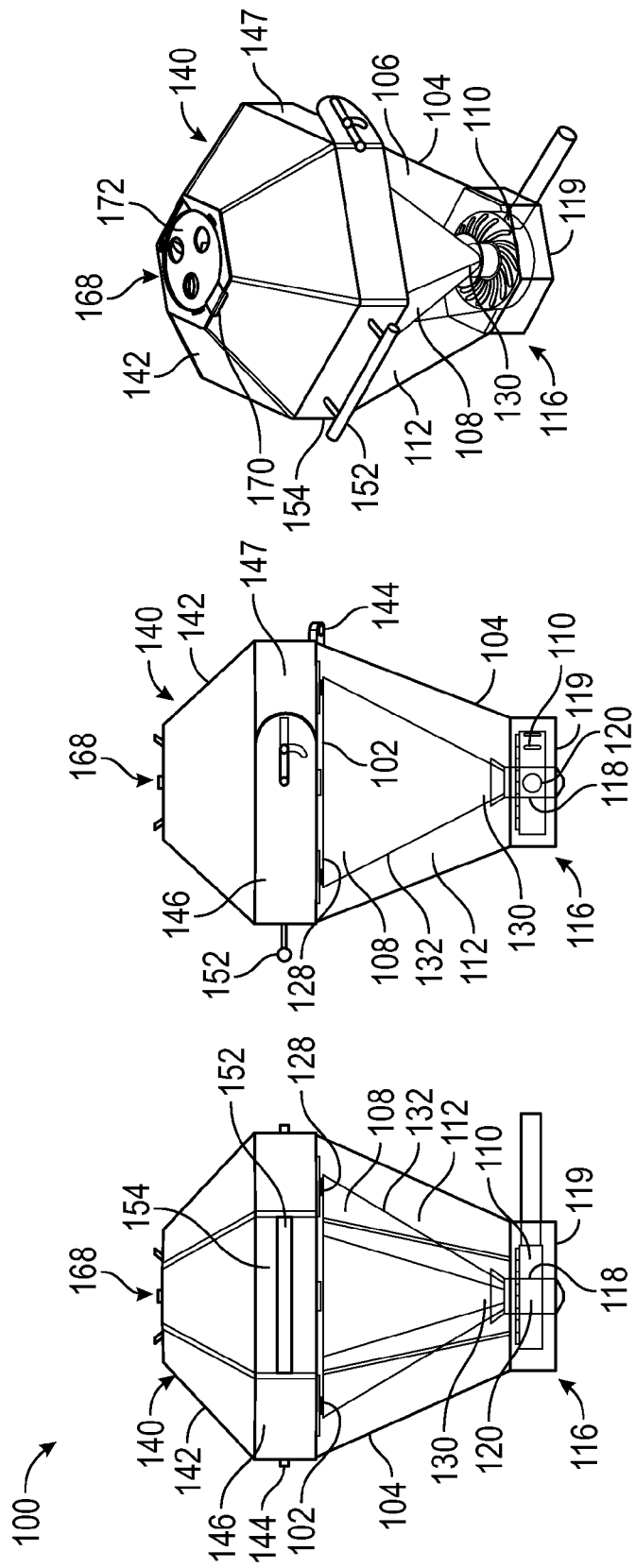

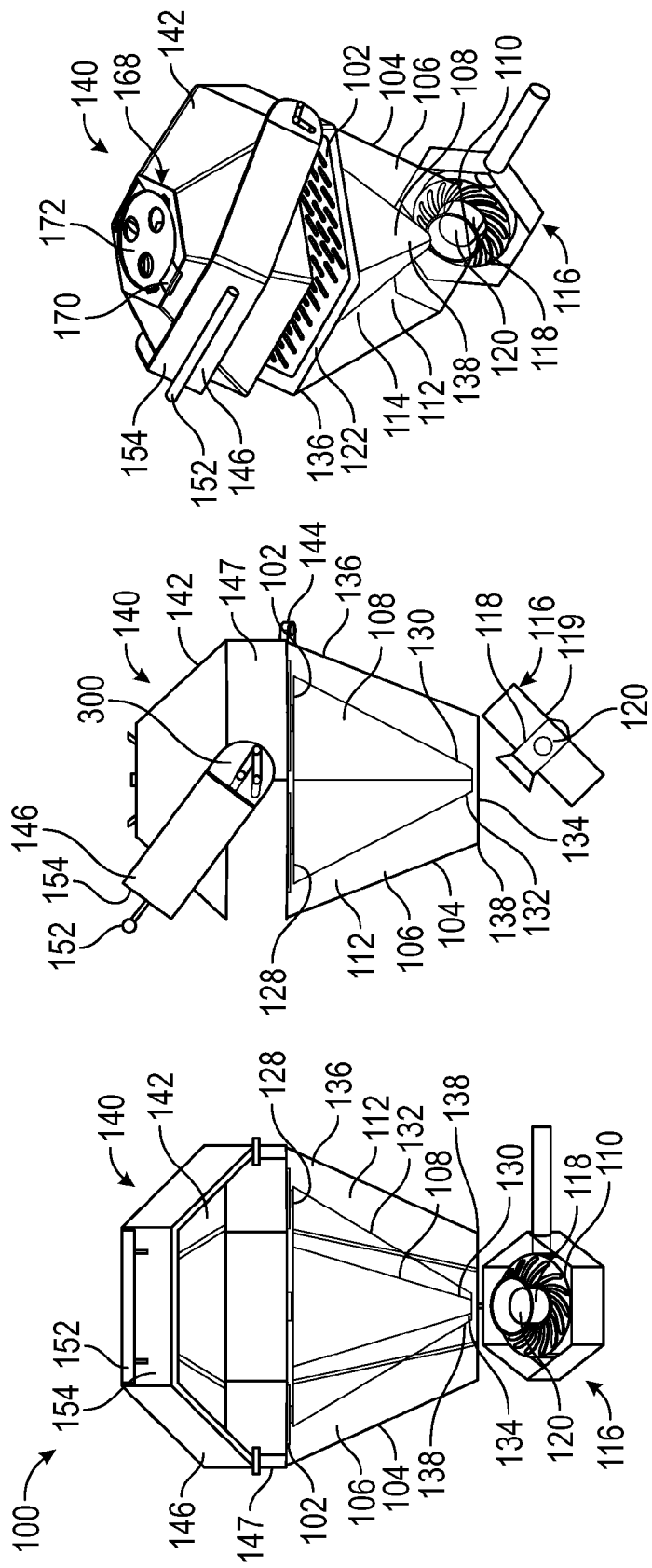

Section A-A

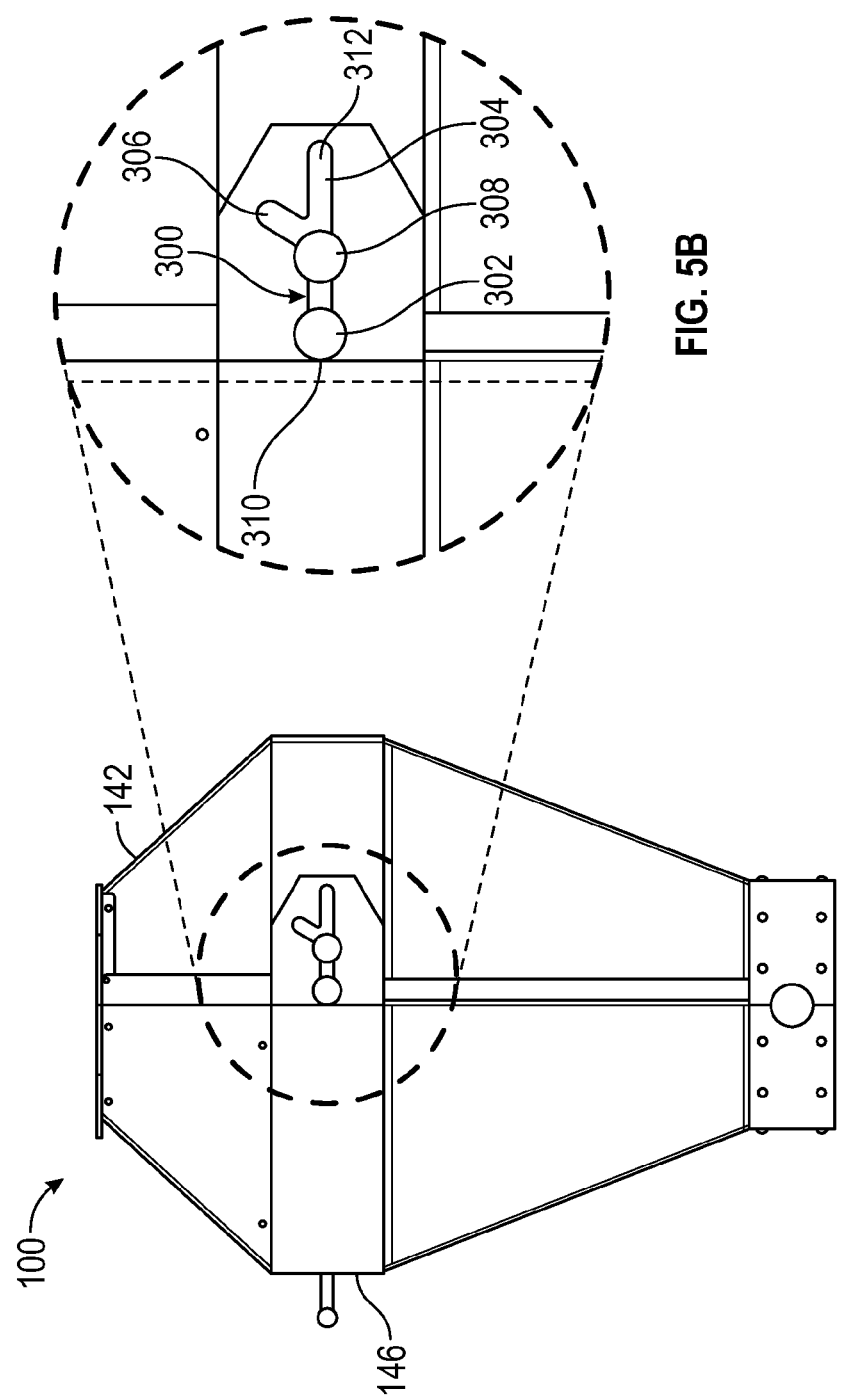

COOKING APPARATUS

INCORPORATION BY REFERENCE TO ANY PRIORITY APPLICATIONS

This application claims priority to U.S. Provisional Patent Application No. 63/269,768, filed Mar. 22, 2022, the entire contents of which are hereby incorporated by reference in their entirety and for all purposes.

BACKGROUND

Field

The field relates to a cooking apparatus, and in particular, to a radiant cooking apparatus having a ceramic inner layer.

Description of the Related Art

Conventional cooking apparatuses, such as ovens, outdoor barbeque grills, and the like, are popular devices for heating food. However, such conventional cooking devices may not cook food evenly, may produce excessive amounts of smoke, and/or may create grease and other waste products. Accordingly, there remains a continued need for an improved cooking apparatus.

SUMMARY

In one embodiment, a cooking apparatus can include: a support structure for supporting food; an outer housing comprising an angled inner sidewall; an inner trough disposed within the outer housing below the support structure; a heating element configured to generate a flame in operation of the cooking apparatus; and an annular gap between the angled inner sidewall of the outer housing and the inner trough, the annular gap extending from the heating element towards the support structure.

In some embodiments, the outer housing includes a generally frustoconical or frustopyramidal structure. In some embodiments, the outer housing includes a generally frustopyramidal structure having a plurality of angled inner side walls disposed about a periphery of the annular gap, the plurality of angled walls including the angled inner sidewall.

In some embodiments, the cooking apparatus further includes a heating element housing coupled to or formed with the outer housing, the heating element disposed in the heating element housing. In some embodiments, the heating element housing includes a tubular portion extending through a hole in the heating element. In some embodiments, the inner trough includes a generally frustoconical or frustopyramidal structure. In some embodiments, the outer housing comprises a generally horizontal structure such that a length of the outer housing is greater than a height of the outer housing. In some embodiments, the heating element extends substantially along the length of the outer housing. In some embodiments, the heating element comprises a tubular burner. In some embodiments, the cooking apparatus further includes a heating element housing coupled to or formed with the outer housing, the heating element disposed in the heating element housing. In some embodiments, the heating element housing includes a tubular portion extending through a hole in the heating element. In some embodiments, the heating element includes electric heating coils.

In some embodiments, the cooking apparatus, further including a flange disposed about the support structure between the support structure and the outer housing and connected to the outer housing, the annular gap extending between the heating element and the flange. In some embodiments, a first angle between an outer surface of the inner trough and a horizontal axis parallel to the support structure is less than a second angle between a lateral surface of the outer housing and the horizontal axis. In some embodiments, the inner trough has a base portion disposed adjacent the support structure and a truncated portion disposed adjacent the heating element, the inner trough tapering downwardly and inwardly towards the heating element such that the base portion is wider than the truncated portion. In some embodiments, during operation of the cooking apparatus, grease flows downwardly along an inner surface of the inner trough through a hole of the heating element to a waste collector. In some embodiments, the truncated portion of the inner trough couples with a tubular portion of a heating element housing in which the heating element is disposed, the tubular portion disposed through the hole of the heating element. In some embodiments, the outer housing has a base portion disposed about a periphery of the support structure and a truncated portion opposite the base portion, the outer housing tapering downwardly and inwardly towards the heating element such that the base portion is wider than the truncated portion.

In some embodiments, the inner trough includes a metallic sheet. In some embodiments, the inner trough includes a mesh. In some embodiments, the inner trough includes stainless steel.

In some embodiments, during operation of the cooking apparatus, the inner trough inhibits the flame from contacting the food. In some embodiments, the angled inner sidewall is angled to direct radiant thermal energy upwardly and inwardly towards the support structure. In some embodiments, the outer housing includes a plurality of layers including a ceramic inner layer. In some embodiments, the ceramic inner layer is an innermost layer of the outer housing exposed to the annular gap. In some embodiments, the ceramic inner layer has a coefficient of thermal expansion (CTE) less than 3.2 ppm/° C. In some embodiments, the ceramic inner layer has a CTE in a range of 0.8 ppm/° C. to 3.2 ppm/° C. In some embodiments, the ceramic inner layer has a heat capacity in a range of 735 J/K to 855 J/K. In some embodiments, the ceramic inner layer has a thermal emissivity in a range of 0.45 to 0.77. In some embodiments, the ceramic inner layer has a thermal conductivity in a range of 1.35 W/m·K to 3.15 W/m·K. In some embodiments, a thickness of the ceramic inner layer is in a range of 0.25" to 0.75". In some embodiments, the ceramic inner layer comprises fused silica. In some embodiments. the ceramic layer further comprises silicon carbide. In some embodiments, the ceramic inner layer comprises magnesium-alumino-silicate. In some embodiments, the ceramic inner layer comprises METEORITE™ CERAMIC. In some embodiments, the plurality of layers further comprises an insulating layer disposed laterally outwardly relative to the ceramic inner layer. In some embodiments, the insulating layer has a thermal conductivity less than a thermal conductivity of the ceramic inner layer. In some embodiments, the plurality of layers includes an outer shell layer, the insulating layer disposed between the outer shell layer and the ceramic inner layer. In some embodiments, the annular gap comprises a thermal pathway between the heating element and the support structure.

In some embodiments, the cooking apparatus further including a lid coupled to the outer housing, the lid including a cover rotatable relative to the outer housing about a pivot axis. the cover having a closed position and at least one open position. In some embodiments, the lid further includes a hatch coupled with and rotatable relative to the cover, the hatch having a closed position and at least one open position. In some embodiments, the lid has a closed configuration in which the cover is in the closed position and the hatch is in the closed position. In some embodiments, the lid has an open configuration in which the cover is in the open position. In some embodiments, the cover in the open position is at an angle of at least 45° relative to the support structure. In some embodiments, the lid has an access configuration in which the hatch is in the open position. In some embodiments, in the access configuration, the cover is capable of being in the closed position. In some embodiments, the hatch includes a slot, and the cover includes a first pin disposed in the slot, the hatch rotatable about the first pin. In some embodiments, the slot includes a horizontal track and an angled track. In some embodiments, the cover includes a second pin disposed in the slot. In some embodiments, the horizontal track includes a first portion and a second portion, the angled track extending from the horizontal track at a location between the first and second portions. In some embodiments, in the closed position of the hatch, at least the first pin is disposed in the first portion of the horizontal track. In some embodiments, in the open position of the hatch, the first pin is disposed in the angled track and the second pin is disposed in the second portion of the horizontal track. In some embodiments, further including a vent coupled to an upper portion of the cover, the vent including a vent body and a vent cap rotatable relative to the vent body.

In another embodiment, a cooking apparatus can include: an outer housing configured to couple to a support structure for supporting food; and a lid coupled to the outer housing, the lid can include: a cover rotatable relative to the outer housing about a pivot axis, the cover having a closed position and at least one open position; and a hatch coupled with and rotatable relative to the cover, the hatch having a closed position and at least one open position.

In some embodiments, the lid has a closed configuration in which the cover is in the closed position and the hatch is in the closed position. In some embodiments, the lid has an open configuration in which the cover is in the open position. In some embodiments, the cover in the open position is at an angle of at least 45° relative to the support structure. In some embodiments, the lid has an access configuration in which the hatch is in the open position. In some embodiments, in the access configuration, the cover is capable of being in the closed position. In some embodiments, the hatch includes a slot, and the cover includes a first pin disposed in the slot, the hatch rotatable about the first pin. In some embodiments, the slot includes a horizontal track and an angled track. In some embodiments, the cover includes a second pin disposed in the slot. In some embodiments, the horizontal track includes a first portion and a second portion, the angled track extending from the horizontal track at a location between the first and second portions. In some embodiments, in the closed position of the hatch, at least the first pin is disposed in the first portion of the horizontal track. In some embodiments, in the open position of the hatch, the first pin is disposed in the angled track and the second pin is disposed in the second portion of the horizontal track. In some embodiments, the cooking apparatus further including a vent coupled to an upper portion of the cover, the vent including a vent body and a vent cap rotatable relative to the vent body.

In another embodiment, a cooking apparatus can include: a support structure for supporting food; an outer housing; a heating element housing configured to receive a heating element, the heating element housing comprising an opening therethrough; and an inner trough disposed within the outer housing below the support structure, the inner trough having a base portion adjacent the support structure and a truncated portion opposite the base portion, the base portion wider than the truncated portion, the truncated portion extending into the opening.

In some embodiments, the cooking apparatus further includes a heating element configured to generate a flame in operation of the cooking apparatus, the heating element disposed in the heating element housing. In some embodiments, the heating element housing comprises a tubular portion extending through a hole in the heating element. In some embodiments, the truncated portion of the inner trough couples with a tubular portion of a heating element housing in which the heating element is disposed, the tubular portion disposed through the hole of the heating element. In some embodiments, during operation of the cooking apparatus, grease flows downwardly along an inner surface of the inner trough through a hole of the heating element to a waste collector.

In another embodiment, a cooking apparatus can include: an outer housing comprising: a base portion; a truncated portion narrower than the base portion; at least one inner angled sidewall disposed about a cavity, the inner angled sidewall(s) tapering inwardly from the base portion to the truncated portion, the angled inner sidewall(s) comprising a ceramic inner layer.

In some embodiments, the outer housing includes a generally frustoconical or frustopyramidal structure. In some embodiments, the outer housing includes a generally frustopyramidal structure having a plurality of angled inner side walls disposed about a periphery of the annular gap, the plurality of angled walls including the angled inner sidewall. In some embodiments, the outer housing includes an outmost metal housing layer. In some embodiments, the outer housing includes an ceramic inner layer is the innermost layer. In some embodiments, the outer housing includes an insulation layer disposed between the ceramic inner layer and the external metal housing layer.

In another embodiment, a cooking apparatus can comprise a support structure for supporting food, an outer housing, a heating element housing configured to receive a heating element, where the heating element housing can comprise an opening therethrough, and an inner trough that can be disposed within the outer housing below the support structure. The inner trough can have a base portion adjacent the support structure and a truncated portion opposite the base portion. The base portion can be wider than the truncated portion, and the truncated portion can extend into the opening. In other embodiments, the cooking apparatus can further comprise a heating element configured to generate a flame in operation of the cooking apparatus. The heating element can be disposed in the heating element housing. The heating element housing can include a tubular portion extending through a hole in the heating element. The truncated portion of the inner trough can couple with a tubular portion of a heating element housing in which the heating element is disposed. The tubular portion disposed through the hole of the heating element. During operation of the cooking apparatus, grease flows downwardly along an inner surface of the inner trough through a hole of the heating element to a waste collector.

Another embodiment can include a cooking apparatus comprising an outer housing. The outer housing can include a base portion, a truncated portion that can be narrower than the base portion, and at least one inner angled sidewall disposed about a cavity. The inner angled sidewall(s) can taper inwardly from the base portion to the truncated portion. The angled inner sidewall(s) can also comprise a ceramic inner layer. As shown in FIGS. 1A-5, the outer housing can comprise a generally frustoconical or frustopyramidal structure. The outer housing can comprise a generally frustopyramidal structure having a plurality of angled inner side walls that can be disposed about a periphery of the annular gap. The plurality of angled walls can include the angled inner sidewall. In some embodiments, the outer housing comprises a generally horizontal structure such that the length of the outer housing is greater than the height of the outer housing. In some embodiments, the outer housing can include an outermost metal housing layer. In other embodiments, the outer housing can have a ceramic inner layer as the innermost layer. The outer housing can further comprise an insulation layer disposed between the ceramic inner layer and the external metal housing layer.

BRIEF DESCRIPTION OF THE DRAWINGS

FIGS. 2A-2F are schematic perspective views of a cooking apparatus.

FIG. 5A is a schematic side sectional view of the cooking apparatus of FIGS. 1A-4B.

FIG. 5B is a schematic side sectional view of a slot of the cooking apparatus of FIG. 5A.

DETAILED DESCRIPTION

Overview

Conventional cooking apparatuses like grills or outdoor ovens are popular but nevertheless have various disadvantages. Such disadvantages include the uneven cooking of foods, failing to cook food thoroughly inside and out, producing excess amounts of smoke during preparation, burning or charring food due to contact with the flame, and the danger of flare ups when cooking over an open source, which is commonly caused by grease drippings from the food being cooked. Another problem is that it can be challenging to maintain generally uniform heat throughout the cooking apparatus. Accordingly, there is a continued demand for cooking apparatuses with the ability to cook food evenly and in a manner that reduces flare ups and smoke.

Embodiments of the present enclosure provide a cooking apparatus comprising a support structure for supporting food, an outer housing comprising an angled inner sidewall, an inner trough disposed within the outer housing below the support structure, a heating element configured to generate a flame in operation of the cooking apparatus, and an annular gap between the angled inner sidewall of the outer housing and the inner trough. The annular gap can extend from the heating element towards the support structure. Such cooking apparatus are able to cook food more evenly in comparison to a conventional cooking apparatus which may struggle to ensure adequate temperatures throughout the cooking apparatus and/or may lead to flare ups and excessive smoke. Moreover, embodiments of the present disclosure are also able to remove grease more effectively than conventional ovens and grills, thereby reducing the possibility of grease flareups during the cooking process.

The arrangement of the housing and the use of a ceramic material in the housing (e.g., Meteorite™ ceramic material, distributed by Meteor Ovens, Inc. of Berkeley, CA) can enable a more effective manner of cooking food. For example, the disclosed cooking apparatus can utilize infrared energy to create food in an energy efficient and versatile manner. Moreover, the disclosed apparatus can remove grease from the grill body thus reducing flare ups and the excessive production of grease.

Example Embodiments of Cooking Apparatuses

Figure 1A:
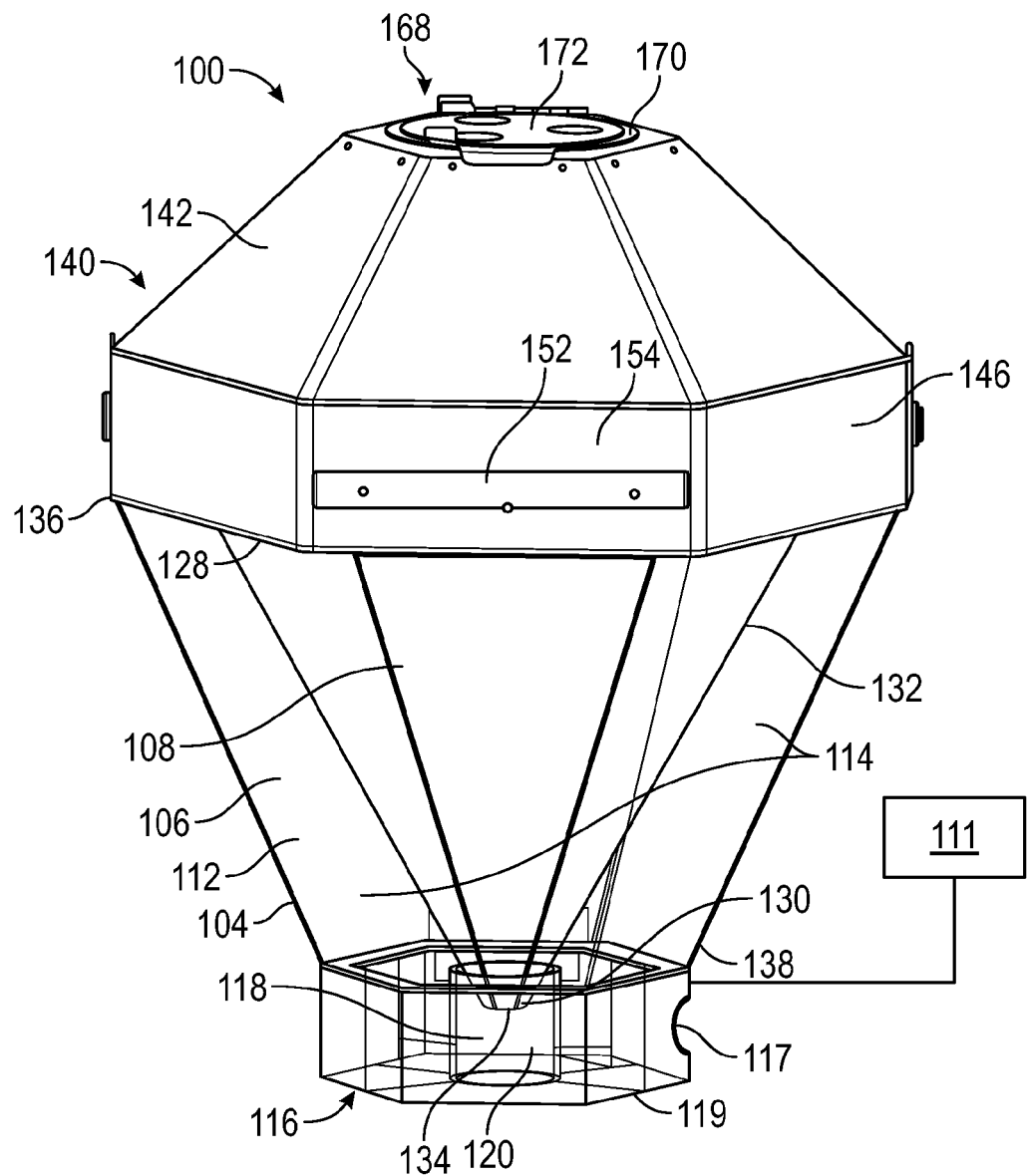
FIG. 1A is a schematic perspective view of a cooking apparatus, according to various embodiments.
Figure 1B:
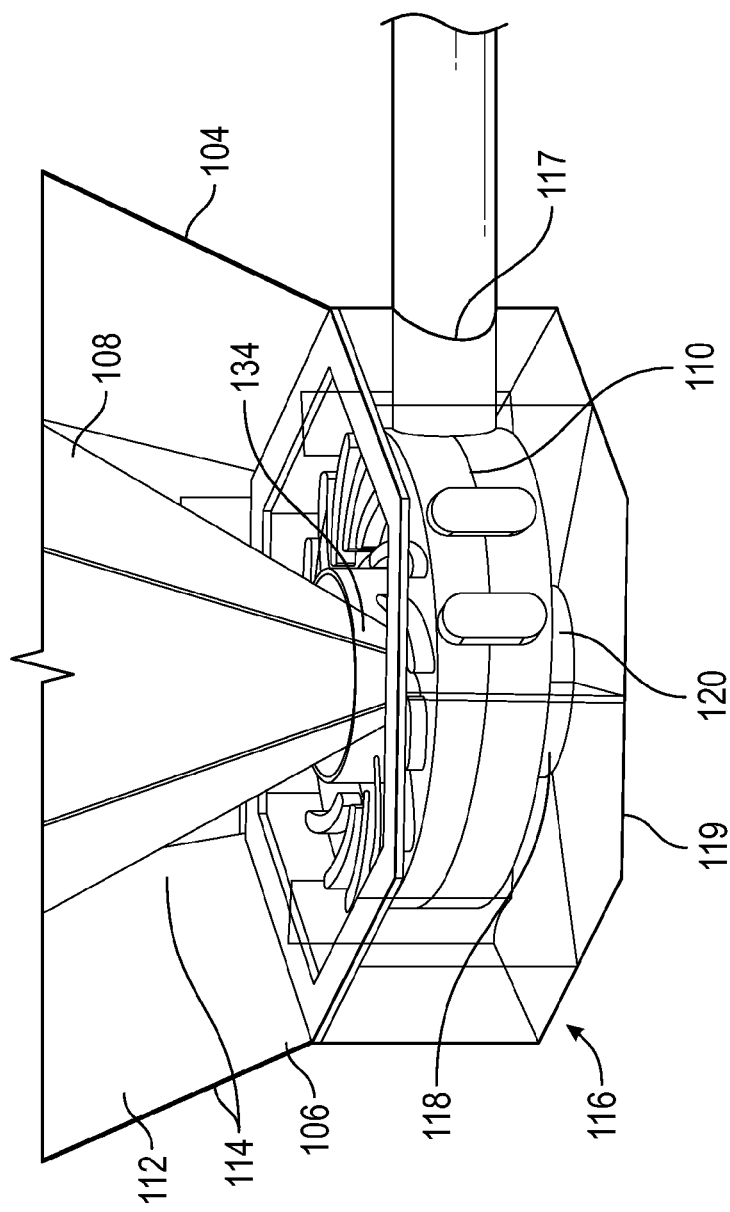
FIG. 1B is a schematic perspective view of a heating element of the cooking apparatus of FIG. 1A, according to various embodiments.

FIGS. 1A-2F illustrate schematic perspective views of a cooking apparatus (FIG. 1A), a schematic perspective view of a heating element of the cooking apparatus of FIG. 1A (FIG. 1B), several schematic perspective views of the cooking apparatus of FIGS. 1A-1B (FIGS. 2A-2F). In one embodiment, as shown in FIGS. 1A-2F, the cooking apparatus 100 can include a support structure 102 for supporting food and/or other items to be heated, an outer housing 104 having an angled inner sidewall 106, an inner trough 108 disposed within the outer housing 104 and below the support structure 102, a heating element 110 to generate a flame in operation of the cooking apparatus 100, and an annular gap 112 between the angled inner sidewall 106 of the outer housing 104 and the inner trough 108. The annular gap 112 can extend from the heating element 110 towards the support structure 102. As shown in FIG. 1A, the outer housing 104 of the cooking apparatus 100 may include a generally frustoconical or frustopyramidal structure. The generally frustopyramidal structure can have a plurality of angled inner side walls 114 disposed about a periphery of the annular gap 112. In other embodiments, the plurality of angled inner side walls 114 can include the angled inner sidewall 106. In some embodiments, the cooking apparatus can include a controller 111 that can adjust the intensity of the heat produced by the burner and/or the temperature inside the cooking apparatus 100.

A heating element housing 116 can be coupled to and/or formed with the outer housing 104 in which the heating element 110 is disposed in the heating element housing 116. The heating element housing 116 can include a tubular portion 118 extending through a hole 120 in the heating element 110. The heating element housing 116 can further include a heating element cutout 117 to receive and/or support the heating element 110 into the heating element housing 116. The heating element housing 116 can also further include a bottom plate 119 to support the heating element 110. The hole 120 can continue through the bottom plate 119 to allow grease and/or other debris to exit through the hole 120.

In some embodiments, the cooking apparatus 100 may also contain an inner trough 108 having of a generally frustoconical or frustopyramidal structure. A flange 122 may be disposed about the support structure 102 between the support structure 102 for supporting food and the outer housing 104, where the flange 122 is connected to the outer housing 104. The annular gap 112 may extend between the heating element 110 and the flange 122. The inner trough 108 can have a base portion 128 disposed adjacent the support structure 102 and a truncated portion 130 disposed adjacent the heating element 110. The inner trough 108 can taper downwardly and inwardly towards the heating element 110 such that the base portion 128 is wider than the truncated portion 130.

During operation of the cooking apparatus 100, grease can flow downwardly along an inner surface 132 of the inner trough 108. Grease can then exit the inner trough 108 through a hole 134 of the heating element 110 to a waste collector (such as a waste bucket or other waste collection system). Also, due to the intense heat of the inner trough 108, grease may be vaporized and bounce down the surface of the inner trough 108. The intense heat of the inner trough 108 can beneficially maintain the cleanliness of the surface of the inner trough 108 as the grease bounces off the surfaces. The truncated portion 130 of the inner trough 108 couples with the tubular portion 118 of the heating element housing 116 in which the heating element 110 is disposed. As shown in FIGS. 1A, 1B, and 2E, the tubular portion 118 can be disposed through the hole 134 of the heating element 110. The inner trough 108 can inhibit grease flare ups by preventing the grease from contacting the heating element 110 and evacuating the grease out of the cooking apparatus 100.

The outer housing 104 can have a base portion 136 disposed about a periphery of the support structure 102 and a truncated portion 138 opposite the base portion. The outer housing 104 can taper downwardly and inwardly towards the heating element 110 such that the base portion 136 is wider than the truncated portion 138.

The inner trough 108 can include a metallic sheet in some embodiments. In other embodiments, the inner trough can comprise a mesh. Using a mesh material for the inner trough 108 may eliminate potential cold spots in the center of the cooking apparatus 100 and support structure 102 for the food. A mesh material may enable even heat distribution through the inside of the cooking apparatus 100. Also, a mesh material can allow the inner trough 108 to cycle between hot and cold stages without damaging the inner trough 108. The inner trough 108 may further include stainless steel. During operation of the cooking apparatus 100. the inner trough 108 can inhibit the flame from contacting the food.

Figure 3:
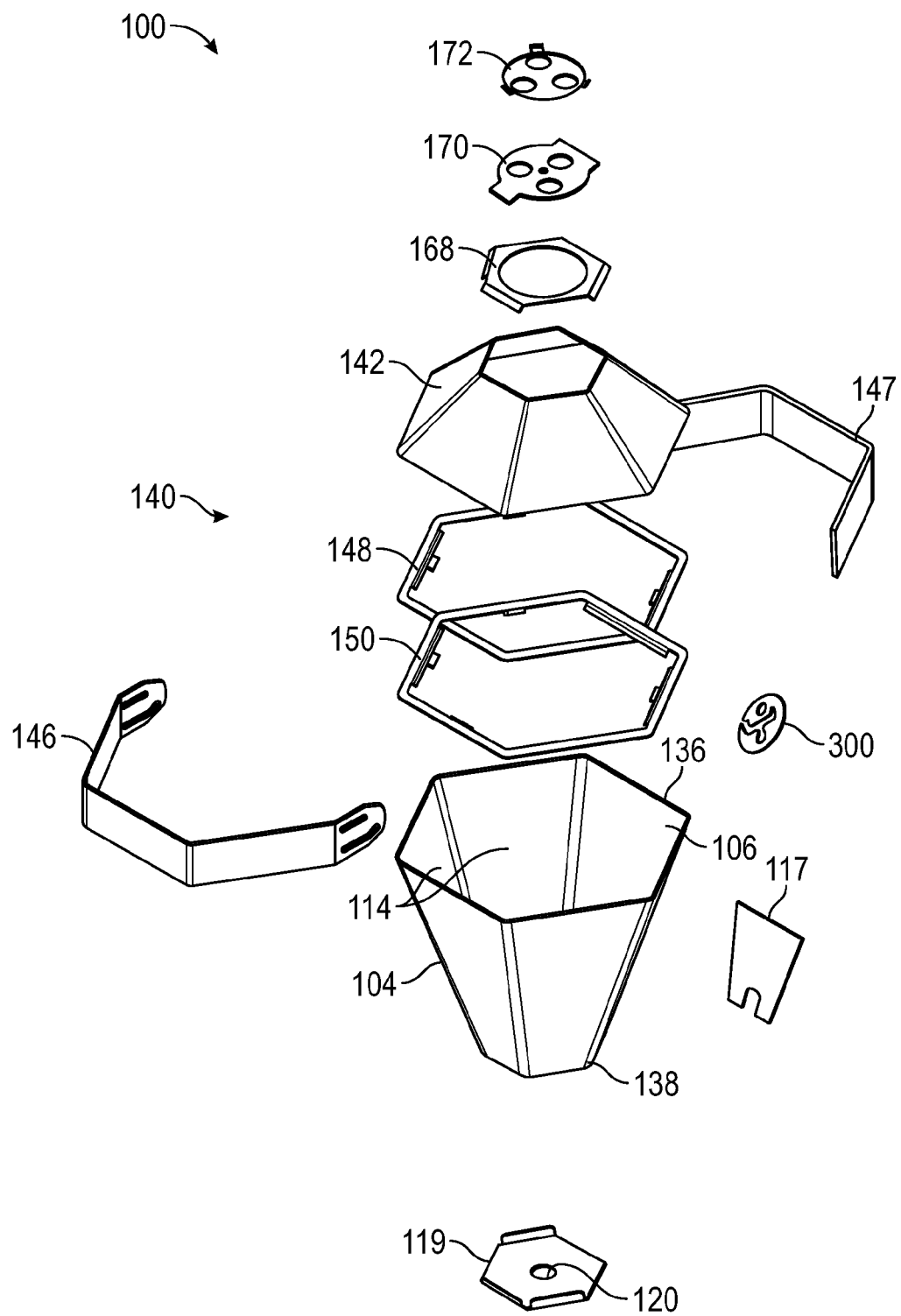
FIG. 3 is a schematic perspective exploded view of the cooking apparatus of FIGS. 1A-2F.

As shown in FIGS. 1A-2F. the cooking apparatus 100 can have a lid 140 coupled to the outer housing 104. The lid 140 can include a cover 142 that can rotate relative to the outer housing 104 about a pivot axis 144. The cover 142 can have a closed position and at least one open position. The lid 140 can further include a hatch 146 coupled to the cover 142 and that can rotate relative to the cover 142. The hatch 146 can further be coupled to a hatch support 147. In reference to FIGS. 2A-2C, the hatch 146 can include a closed position. As shown in FIGS. 2D-2F, the hatch 146 can include at least one open position. In some embodiments, as shown in FIG. 3. the hatch 146 is disposed between an upper cover ring 148 and a lower cover ring 150. As shown in FIGS. 1A-2F, a handle 152 may be attached to the handle surface 154 of the hatch 146. The handle surface 154 may be located on a front side of the hatch 146 and/or on a side surface. In some embodiments, the lid 140 can have a closed configuration in which the cover is in the closed position and the hatch is in the closed position. As shown in FIGS. 2D-2F, the lid can include an open configuration in which the cover is in the open position. The cover 142 in the open position can be at an angle of at least 45° relative to the support structure. The lid can have an access configuration in which the hatch is in the open position. In the access configuration, the cover is capable of being in the closed position. In other embodiments, the cooking apparatus 100 can further include a vent 168 coupled to an upper portion of the cover 142. The vent 168 can include a vent body 170 and a vent cap 172 rotatable relative to the vent body 170.

Figure 4C:
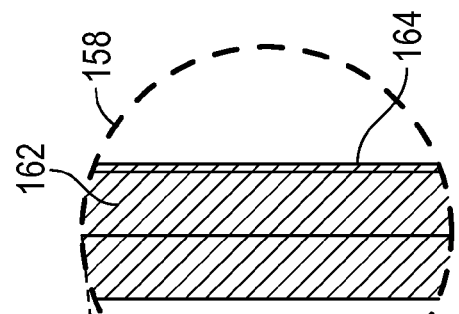
FIG. 4C is a schematic cutout view of a plurality of layers of the cooking apparatus of FIGS. 1A-4B.
Figure 4B:
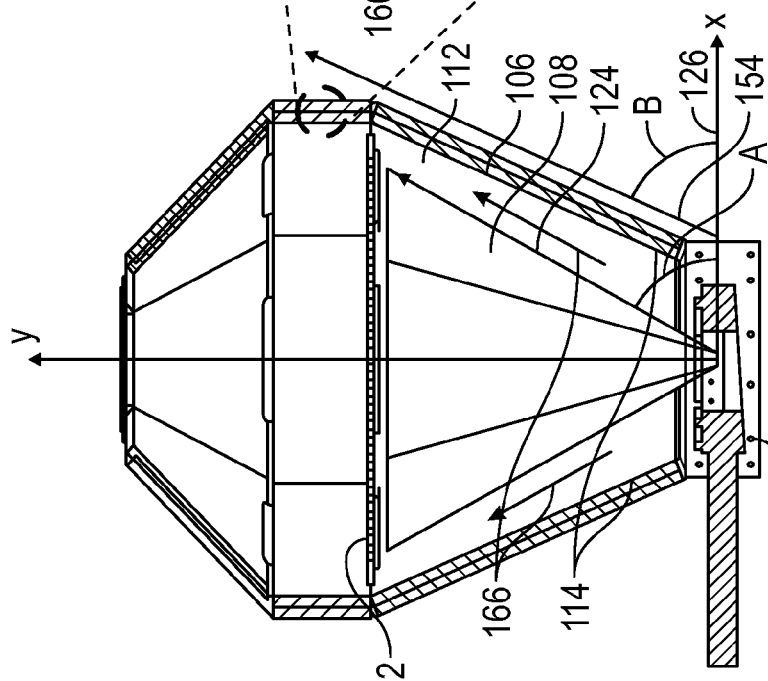
FIG. 4B is a side plan view of the cooking apparatus of FIG. 4A along the cutout lines AA.
Figure 4A:
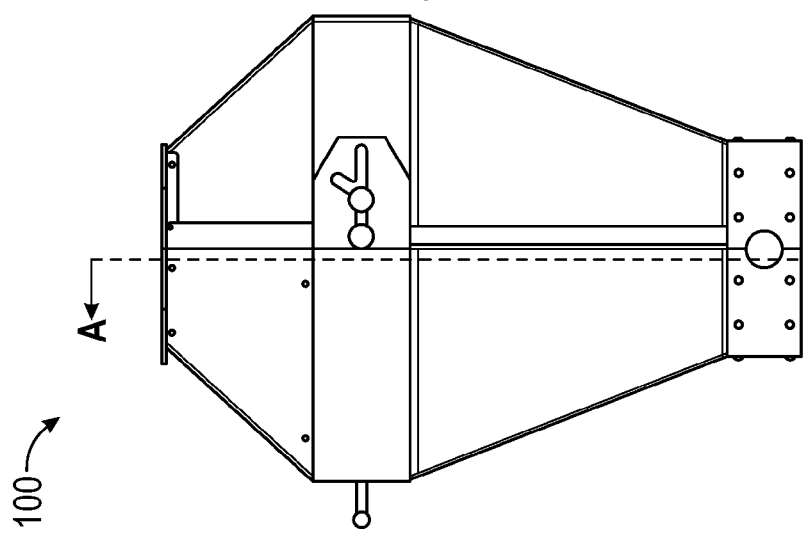
FIG. 4A is a schematic side sectional view of the cooking apparatus of FIGS. 1A-3.

FIG. 4A illustrates a schematic side sectional view of the cooking apparatus 100 described above. FIG. 4B illustrates a side plan view of the cooking apparatus of FIG. 4A along the cutout lines AA. The cooking apparatus 100 can include a first angle A between an outer surface 124 of the inner trough 108 and a horizontal axis 126 parallel to the support structure 102 can be less than a second angle B between a lateral surface 156 of the outer housing 104 and the horizontal axis 126.

As shown in FIG. 4B, the angled inner sidewall 106 can be angled to direct radiant thermal energy upwardly and inwardly towards the support structure 102. FIG. 4C illustrates a cutaway view of the different layers 158 found in the cooking apparatus 100. For example, the outer housing 104 can include a plurality of layers 158 having a ceramic inner layer 160. The ceramic inner layer 160 can be an innermost layer of the outer housing 104 and exposed to the annular gap 112. The ceramic inner layer 160 can have a coefficient of thermal expansion (CTE) less than 3.5 ppm/° C. less than 3.25 ppm/° C. or less than 3.2 ppm/° C. Further. the ceramic inner layer 160 can have a CTE in a range of 0.5 ppm/° C. to 3.5 ppm/° C. in a range of 0.75 ppm/° C. to 3.25 ppm/° C., or in a range of 0.8 ppm/° C. to 3.2 ppm/° C. The ceramic inner layer 160 can have a heat capacity in a range of 700 J/K to 900 J/K, a range of 725 J/K to 875 J/K, or range of 735 J/K to 855 J/K. The ceramic inner layer 160 can have a thermal emissivity in a range of 0.35 to 0.85, in a range of 0.40 to 0.80, or in a range of 0.45 to 0.77. The ceramic inner layer 160 can have a thermal conductivity in a range of 1.00 W/m·K to 4.00 W/m·K. in a range of 1.25 W/m·K to 3.25 W/m·K, or in a range of 1.35 W/m·K to 3.15 W/m·K. The thickness of the ceramic inner layer 160 can be in a range of 0.25" to 0.75". The ceramic inner layer 160 can include fused silica in some embodiments. In some embodiments, the ceramic inner layer 160 can further include silicon carbide. In other embodiments, the ceramic inner layer 160 can include magnesium-alumino-silicate. For example, in some embodiments, the ceramic inner layer 160 can comprise METEORITE™ CERAMIC of Berkeley, CA.

As shown in FIG. 4C, the plurality of layers 158 can further include an insulating layer 162 disposed laterally outwardly relative to the ceramic inner layer 160. The insulating layer 162 can have a thermal conductivity less than a thermal conductivity of the ceramic inner layer 160. In some embodiments, the plurality of layers 158 can also include an outer shell layer 164. The insulating layer 162 can be disposed between the outer shell layer 164 and the ceramic inner layer 160. The plurality of layers 158 can store and radiate the heat from the heating element 110 in such a manner that food can be cooked uniformly. The annular gap 112 can include a thermal pathway 166 between the heating element 110 and the support structure 102. A warm gas can raise through the annular gap 112 to aid in cooking the food on the support structure 102. The configuration of the angled inner side walls 114, inner trough 108, and annular gap 112 can direct heat from the heating element 110 towards the angled inner side walls 114 which can radiate the heat towards the food. As shown in FIG. 4B, the diamond-shape configuration of the angled inner side walls 114, inner trough 108, and annular gap 112 can also create a focus of infrared heat towards the support structure 102 for food due to the infrared heat being reflected 90 degrees from the surface of the angled inner side walls 114. This diamond configuration can also aid in eliminating cold spots in the cooking apparatus 100 and can create an even distribution of heat to uniformly cook the food.

FIG. 5A illustrates a schematic side sectional view of the cooking apparatus 100 described above. FIG. 5B illustrates a side plan view of a slot of the cooking apparatus of FIG. 5A. As shown in FIG. 5B, the hatch 146 can further include a slot 300, and the cover 142 can include a first pin 302 disposed in the slot 300. The hatch 146 can rotate upward and/or downward about the first pin 302. The slot 300 can include a horizontal track 304 and also an angled track 306. The cover 142 can also include a second pin 308 disposed in the slot 300. The horizontal track 304 can include a first portion 310 and a second portion 312. The angled track 306 can extend from the horizontal track 304 at a location between the first and second portions 310, 312. In various embodiments, in the closed position of the hatch 146, at least the first pin 302 can be disposed in the first portion 310 of the horizontal track 304. In another embodiment, in the open position of the hatch 146, the first pin 302 can be disposed in the angled track 306 and the second pin 308 can be disposed in the second portion 312 of the horizontal track 304. The option to open either the cover 142 and/or hatch 146 provides a user of the cooking apparatus 100 a choice depending on the size of the opening required. When a user wants to add or remove a larger food item, the user can open the lid 140 to access the support structure 102 for food. In instances where the food item is smaller or the user desires to change the positioning of the food, the user can open the hatch 146 to access the support structure 102 for food, which can reduce the amount of heat escaping when opened.

Figure 6:
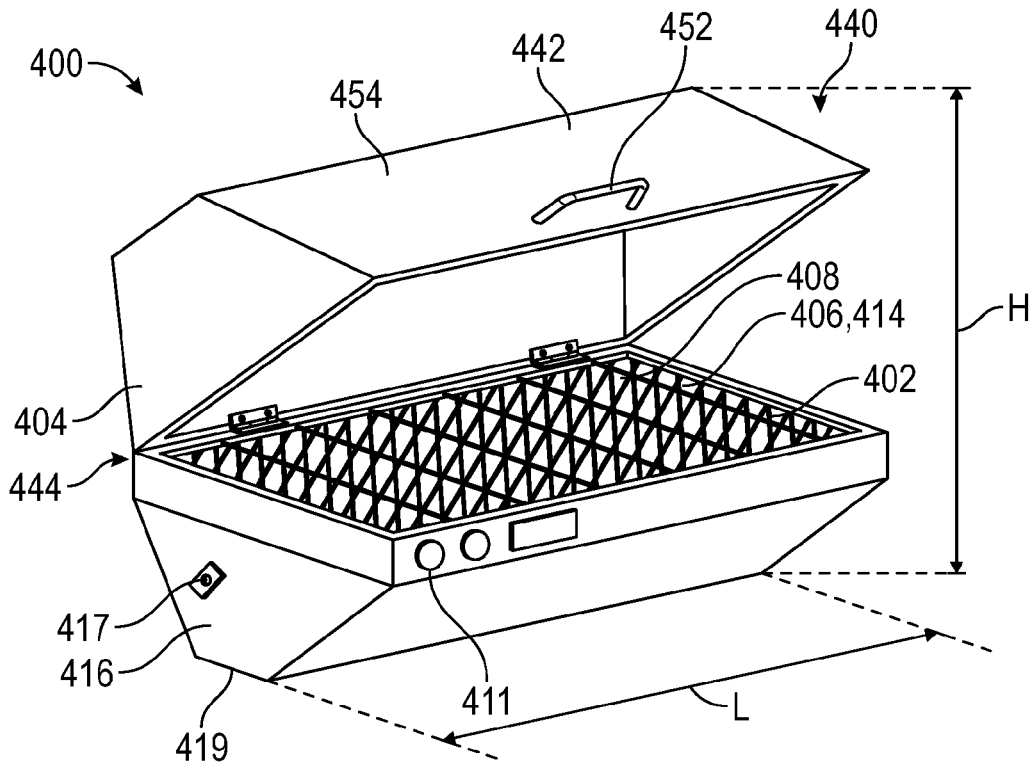
FIG. 6 is a schematic perspective view of another embodiment of a cooking apparatus, according to various embodiments.
Figure 7:
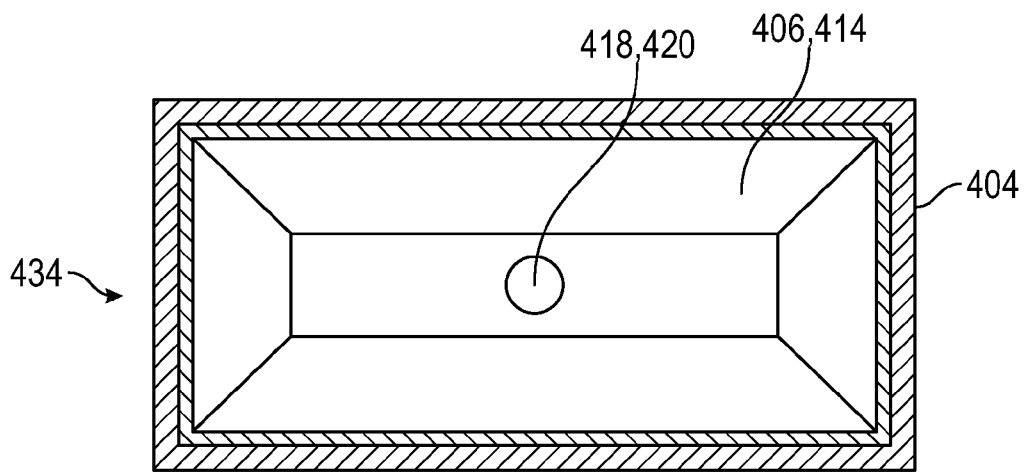
FIG. 7 illustrates a schematic top-down view of a base of the cooking apparatus of FIG. 6.
Figure 8:
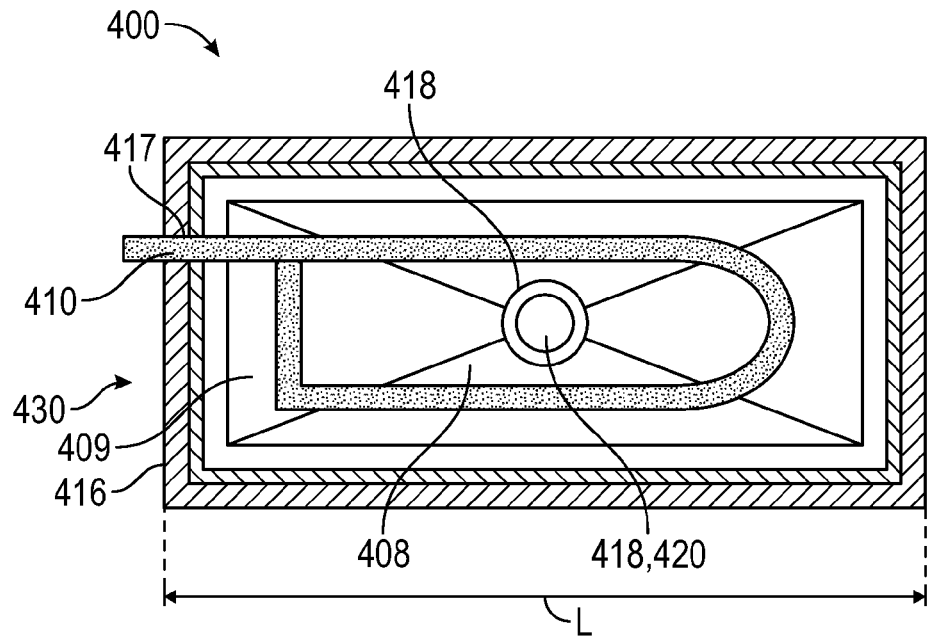
FIG. 8 is a top-down schematic perspective view of a heating element housing of the cooking apparatus of FIGS. 6-7.

FIGS. 6-8 illustrate a schematic perspective view of another embodiment of a cooking apparatus 400 (FIG. 6), a schematic perspective view a heating element housing of the cooking apparatus 400 of FIG. 6 (FIG. 7), and a schematic perspective view of a lid of the cooking apparatus 400 of FIG. 6 (FIG. 8). The cooking apparatus 400 can be similar and/or identical to cooking apparatus 100 described herein in some or many respects except that cooking apparatus 400 includes a generally horizontal configuration. With reference to FIGS. 6-8, some of the components of the cooking apparatus 400 shares reference numbers with the components of cooking apparatus 100. In some cases, like numbers in the cooking apparatus 400 indicate components which are similar to or suitably constructed compared to those components disclosed and described above with respect to cooking apparatus 100.

As shown in FIG. 6, the outer housing 404 of the cooking apparatus 400 may include a generally horizontal configuration in which the length L of the outer housing 404 is greater than its height H. The cooking apparatus 400 can include a support structure 402 that extends substantially along the horizontal length of the cooking apparatus 400 for supporting food and/or other items to be heated. The cooking apparatus 400 can further include an angled and/or a curved inner sidewall 406. An inner trough 408 can be disposed within the outer housing 404 and below the support structure 402 which may also extend substantially along the horizontal length of the cooking apparatus 400 and/or short segments of the horizontal length. A channel 409 can be positioned below the inner trough 408 with the inner trough 408 tapering downwardly and inwardly towards the channel 409 such that any grease and/or byproducts are transferred to the channel 409 from the inner trough 408. The cooking apparatus 400 can also include a heating element 410 positioned within a heating element housing 416 to generate a flame in operation of the cooking apparatus. In some embodiments, the cooking apparatus 400 can include an annular gap 412 between the angled inner sidewall 406 of the outer housing 404 and the inner trough 408. The annular gap 412 can extend from the heating element 410 towards the support structure 402. The generally horizontal structure can have a plurality of angled inner side walls 414 disposed about a periphery of the channel 409 and/or a periphery of the annular gap 412. In other embodiments, the plurality of angled inner side walls 414 can include the angled inner sidewall 406.

A heating element cutout 417 can be located on a side and/or bottom surface of the cooking apparatus 400 to allow fuel and/or power into the heating element 410. The heating element housing 416 can also further include a bottom plate 419 to support the heating element 410. In some embodiments, the cooking apparatus 400 can include a controller 411 that can adjust the intensity of the heat produced by the burner and/or the temperature inside the cooking apparatus 400. The outer housing 404 can also include a tubular portion 418 extending through a hole 420 in a bottom and/or sidewall of the outer housing 404. The tubular portion can be connected to the channel 409 such that the grease and/or byproducts are transferred from the channel 409 to the tubular portion 418 and out the hole 420.

The cooking apparatus 400 can further include a lid 440 coupled to the outer housing 404. The lid 440 can include a cover 442 that can rotate relative to the outer housing 404 about a pivot axis 444. The cover 442 can have a closed position and at least one open position. In some embodiments, the lid 440 can further include a hatch coupled to the cover 442 and that can rotate relative to the cover 442. The hatch can further be coupled to a hatch support. The hatch can include a closed position. The hatch can include at least one open position. A handle 452 may be attached to the handle surface 454 of the cover 442. The handle surface 454 may be located on a front surface of the cover 442 and/or on a side/lateral surface. In some embodiments, the lid 40 can have a closed configuration in which the cover 442 is in the closed position and the hatch is in the closed position. The lid 440 can include an open configuration in which the cover 442 is in the open position. The cover 442 in the open position can be at an angle of at least 45° relative to the support structure 402. The lid 440 can have an access configuration in which the hatch is in the open position. In the access configuration, the cover 442 is capable of being in the closed position.

FIG. 7 illustrates a schematic top-down view of a base 434 of the cooking apparatus 400. The base 434 can include the angled and/or a curved inner sidewall 406. The tubular portion 418 of the outer surface 404 can extend through the hole 420 located in a bottom and/or sidewall of base 434. FIG. 8 illustrates a top-down view of a bottom portion 430 which can be located in and/or above the base 434. A heating element housing 416 can be coupled to and/or formed within the bottom portion 430 in which the heating element 410 is disposed in the heating element housing 416. In some embodiments, the heating element 410 can be positioned below the trough 408 and channel 409. The heating element 410 can extend substantially along the length L of the cooking apparatus 400. The heating element 410 can include one or more burners. In some embodiments, the burners may include tube type burners which produce a flame. In some embodiments, the heating element 410 can include a U-shaped burner with two lengths connected to each other by a curved segment. The heating element housing 416 can further include the heating element cutout 417 to receive and/or support the heating element 410 into the heating element housing 416.

Figure 9:
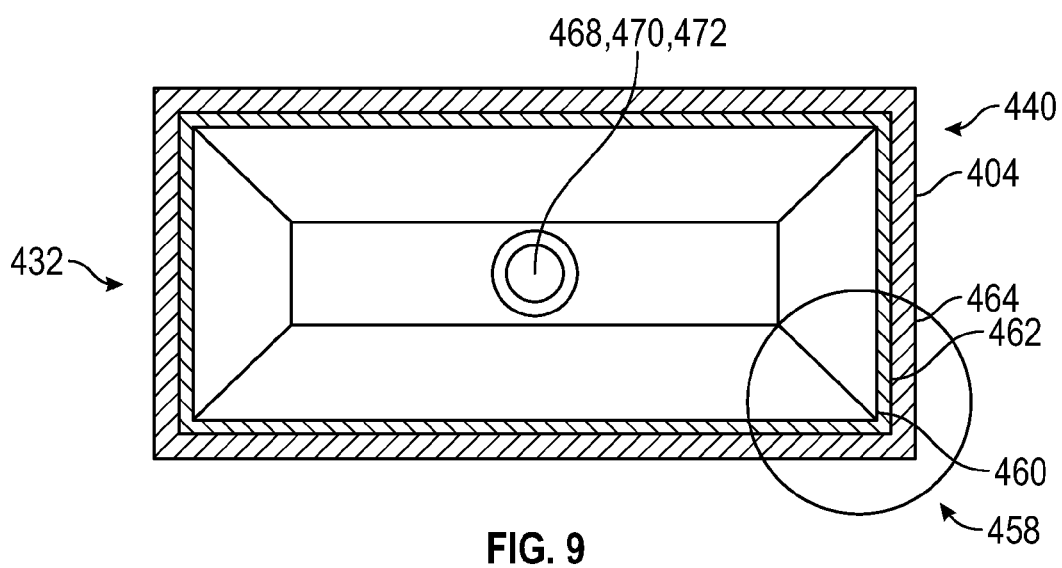
FIG. 9 is a schematic perspective inner view of a lid of the cooking apparatus of FIGS. 6-8.

FIG. 9 illustrates a bottom-up view inside of an upper portion 432 of the cooking apparatus 400. The upper portion 432 can include a vent 468 extending through the cover 442. The vent 468 can include a vent body 470 and a vent cap 472 rotatable relative to the vent body 470. The lid 440 can include an upper channel 446 to funnel any smoke from the support structure 402 to the vent 468.

As shown in FIG. 9, the outer housing 404 of the cooking apparatus 400 can include plurality of layers 458 having a ceramic inner layer 460, an insulating layer 462, and an outer shell layer 464. Ceramic inner layer 460, insulating layer 462, and outer shell layer 464 can be similar or identical to ceramic inner layer 160, insulating layer 162, and outer shell layer 164 in some. many. or all respects, and therefore the discussion above with reference to ceramic inner layer 160, an insulating layer 162, and an outer shell layer 164 is equally applicable to ceramic inner layer 460, insulating layer 462, and outer shell layer 464.

Figure 10:
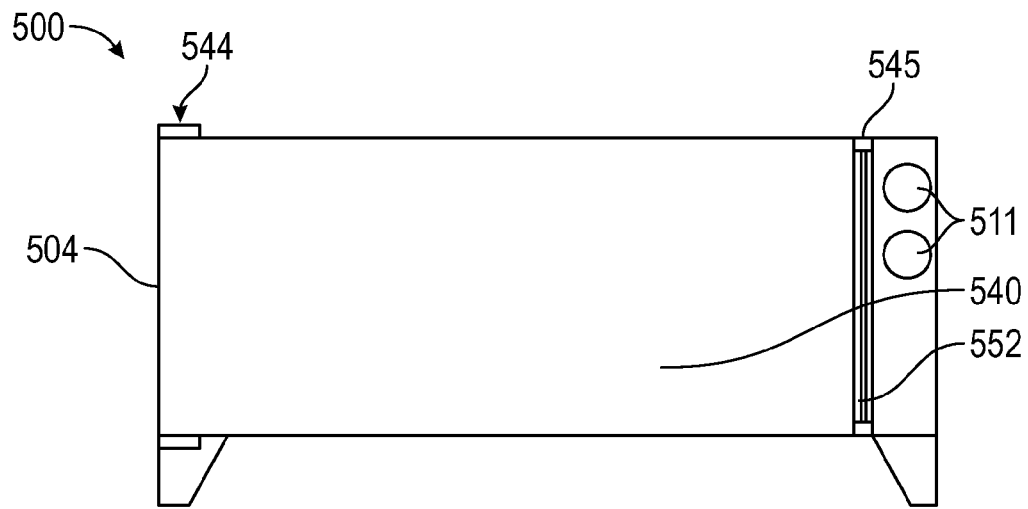
FIG. 10 is a schematic perspective view of another embodiment of a cooking apparatus, according to various embodiments.

FIG. 10 illustrates a schematic front perspective of another embodiment of a cooking apparatus 500 which shares many of the same or similar components in cooking apparatus 100 and/or cooking apparatus 400 described above. As illustrated, some of the components of the cooking apparatus 500 shares reference numbers with the components of cooking apparatus 100 and/or 400. In some cases, like numbers in the cooking apparatus 500 indicate components which are similar to or suitably constructed compared to those components disclosed and described above with respect to cooking apparatus 100 and/or cooking apparatus 400.

Figure 11:
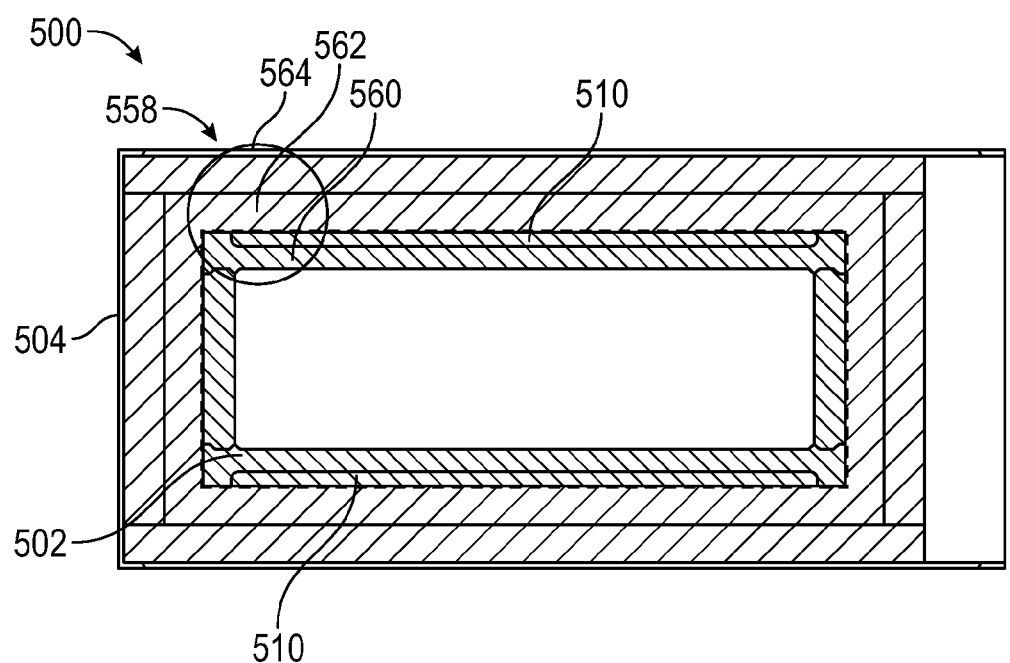
FIG. 11 is a schematic cutout view of the cooking apparatus of FIG. 10.

As shown in FIG. 11, the heating element 510 of the cooking apparatus 500 can be embedded and/or integrated into the ceramic inner layer 560. For example, the heating element 510 can be disposed within indentations of the ceramic inner layer 560 such that the heating element is sandwiched between the ceramic inner layer 560 and the insulating layer 562. In some embodiments, the heating element 510 can include electrical coils. The electric coils can generate heat by producing infrared radiation (IR) in operation of the cooking apparatus 500.

Terminology

Reference throughout this specification to "some embodiments" or "an embodiment" means that a particular feature, structure, element, act, or characteristic described in connection with the embodiment is included in at least one embodiment. Thus, appearances of the phrases "in some embodiments" or "in an embodiment" in various places throughout this specification are not necessarily all referring to the same embodiment and may refer to one or more of the same or different embodiments. Furthermore, the particular features, structures, elements, acts, or characteristics may be combined in any suitable manner (including differently than shown or described) in other embodiments. Further, in various embodiments, features, structures, elements, acts, or characteristics can be combined, merged, rearranged, reordered, or left out altogether. Thus, no single feature, structure, element, act, or characteristic or group of features, structures, elements, acts, or characteristics is necessary or required for each embodiment. All possible combinations and subcombinations are intended to fall within the scope of this disclosure.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

The foregoing description sets forth various example embodiments and other illustrative, but non-limiting, embodiments of the inventions disclosed herein. The description provides details regarding combinations, modes, and uses of the disclosed inventions. Other variations, combinations, modifications, equivalents, modes, uses, implementations, and/or applications of the disclosed features and aspects of the embodiments are also within the scope of this disclosure, including those that become apparent to those of skill in the art upon reading this specification. Additionally, certain objects and advantages of the inventions are described herein. It is to be understood that not necessarily all such objects or advantages may be achieved in any particular embodiment. Thus, for example, those skilled in the art will recognize that the inventions may be embodied or carried out in a manner that achieves or optimizes one advantage or group of advantages as taught herein without necessarily achieving other objects or advantages as may be taught or suggested herein. Also, in any method or process disclosed herein, the acts or operations making up the method or process may be performed in any suitable sequence and are not necessarily limited to any particular disclosed sequence.

What is claimed is:

1. A cooking apparatus comprising:
 a support structure for supporting food;
 an outer housing comprising an angled inner sidewall;
 an inner trough disposed within the outer housing below the support structure;
 a heating element configured to generate a flame in operation of the cooking apparatus;

an annular gap between the angled inner sidewall of the outer housing and the inner trough, the annular gap extending from the heating element towards the support structure; and a lid coupled to the outer housing, the lid comprising:
   a cover rotatable relative to the outer housing about a pivot axis, the cover having a closed position and at least one open position; and
   a hatch coupled with and rotatable relative to the cover, the hatch having a closed position and at least one open position, wherein the hatch comprises a slot, wherein the cover comprises a first pin disposed in the slot, the hatch rotatable about the first pin, and wherein the slot comprises a horizontal track and an angled track, wherein the horizontal track includes a first portion and a second portion, the angled track extending from the horizontal track at a location between the first portion and the second portion, and wherein the cover comprises a second pin disposed in the slot, wherein in the closed position of the hatch, at least the first pin is disposed in the first portion of the horizontal track, and, in the open position of the hatch, the first pin is disposed in the angled track and the second pin is disposed in the second portion of the horizontal track.

2. The cooking apparatus of claim 1, wherein the outer housing comprises a frustoconical or frustopyramidal structure.

3. The cooking apparatus of claim 2, wherein the outer housing comprises a frustopyramidal structure having a plurality of angled inner side walls disposed about a periphery of the annular gap, the plurality of angled inner side walls including the angled inner sidewall.

4. The cooking apparatus of claim 1, further comprising a heating element housing coupled to or formed with the outer housing, the heating element disposed in the heating element housing.

5. The cooking apparatus of claim 1, wherein the outer housing comprises a horizontal structure such that a length of the outer housing is greater than a height of the outer housing.

6. The cooking apparatus of claim 1, further comprising a flange disposed about the support structure between the support structure and the outer housing and connected to the outer housing, the annular gap extending between the heating element and the flange.

7. The cooking apparatus of claim 1, wherein the inner trough has a base portion disposed adjacent the support structure and a truncated portion disposed adjacent the heating element, the inner trough tapering downwardly and inwardly towards the heating element such that the base portion is wider than the truncated portion, wherein during operation of the cooking apparatus, grease flows downwardly along an inner surface of the inner trough through a hole of the heating element to a waste collector.

8. The cooking apparatus of claim 1, wherein the outer housing has a base portion disposed about a periphery of the support structure and a truncated portion opposite the base portion, the outer housing tapering downwardly and inwardly towards the heating element such that the base portion is wider than the truncated portion.

9. The cooking apparatus of claim 1, wherein the inner trough comprises at least one of a metallic sheet, a mesh, and stainless steel.

10. The cooking apparatus of claim 1, wherein, during operation of the cooking apparatus, the inner trough inhibits the flame from contacting the food.

11. The cooking apparatus of claim 1, wherein the angled inner sidewall is angled to direct radiant thermal energy upwardly and inwardly towards the support structure.

12. The cooking apparatus of claim 1, wherein the outer housing comprises a plurality of layers including a ceramic inner layer and an insulating layer disposed laterally outwardly relative to the ceramic inner layer, wherein the plurality of layers comprises an outer shell layer, the insulating layer disposed between the outer shell layer and the ceramic inner layer, and wherein the ceramic inner layer is an innermost layer of the outer housing exposed to the annular gap.

13. The cooking apparatus of claim 12, wherein the ceramic inner layer comprises at least one of fused silica and METEORITE™ CERAMIC.

14. The cooking apparatus of claim 1, wherein the annular gap comprises a thermal pathway between the heating element and the support structure.

15. A cooking apparatus comprising:
   an outer housing configured to couple to a support structure for supporting food; and
   a lid coupled to the outer housing, the lid comprising:
      a cover rotatable relative to the outer housing about a pivot axis, the cover having a closed position and at least one open position; and
      a hatch coupled with and rotatable relative to the cover, the hatch having a closed position and at least one open position, wherein the hatch comprises a slot and the cover comprises a first pin disposed in the slot, the hatch rotatable about the first pin, and wherein the slot comprises a horizontal track and an angled track, wherein the horizontal track includes a first portion and a second portion, the angled track extending from the horizontal track at a location between the first portion and the second portion, and wherein the cover comprises a second pin disposed in the slot, wherein in the closed position of the hatch, at least the first pin is disposed in the first portion of the horizontal track, and, in the open position of the hatch, the first pin is disposed in the angled track and the second pin is disposed in the second portion of the horizontal track.

16. The cooking apparatus of claim 15, wherein the lid has a closed configuration in which the cover is in the closed position and the hatch is in the closed position, and wherein the lid has an open configuration in which the cover is in the open position.

17. The cooking apparatus of claim 15, wherein the lid has an access configuration in which the hatch is in the open position, wherein, in the access configuration, the cover is capable of being in the closed position.

* * * * *